United States Patent
Chen

(10) Patent No.: US 9,900,475 B2
(45) Date of Patent: Feb. 20, 2018

(54) GAMUT MAPPING METHOD

(71) Applicant: Shenzhen China Star Optoelectronics Technology Co., Ltd., Shenzhen, Guangdong (CN)

(72) Inventor: Lixuan Chen, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 98 days.

(21) Appl. No.: 14/890,614

(22) PCT Filed: Oct. 23, 2015

(86) PCT No.: PCT/CN2015/092595
§ 371 (c)(1),
(2) Date: Nov. 12, 2015

(87) PCT Pub. No.: WO2016/206258
PCT Pub. Date: Dec. 29, 2016

(65) Prior Publication Data
US 2017/0195526 A1     Jul. 6, 2017

(30) Foreign Application Priority Data

Jun. 26, 2015   (CN) .......................... 2015 1 0363149

(51) Int. Cl.
*G06T 7/00*        (2017.01)
*H04N 1/60*        (2006.01)
(Continued)

(52) U.S. Cl.
CPC ............ *H04N 1/6052* (2013.01); *G06T 7/11* (2017.01); *G06T 7/13* (2017.01); *G06T 7/168* (2017.01);
(Continued)

(58) Field of Classification Search
None
See application file for complete search history.

(56) References Cited

U.S. PATENT DOCUMENTS

| 5,450,216 A | 9/1995 | Kasson |
| 2003/0012427 A1* | 1/2003 | Martinez-Uriegas H04N 1/6058 382/162 |

(Continued)

FOREIGN PATENT DOCUMENTS

| CN | 1861963 A | 11/2006 |
| CN | 101583040AA | 11/2009 |

OTHER PUBLICATIONS

Dugay, Fabienne, Ivar Farup, and Jon Y. Hardeberg. "Perceptual evaluation of color gamut mapping algorithms." Color Research & Application 33.6 (2008): 470.*

(Continued)

*Primary Examiner* — Ryan M Gray
(74) *Attorney, Agent, or Firm* — Andrew C. Cheng

(57) ABSTRACT

A gamut mapping method. The method includes: inputting an original display image; transforming the original display image to obtain a frequency-domain image in a frequency domain; determining a first portion and a second portion of the frequency-domain image in the frequency domain; respectively transforming the first portion and the second portion of the frequency-domain image to obtain a first portion and a second portion of a transformed image in the spatial domain; respectively utilizing different gamut mapping principles to the first portion and the second portion to perform gamut mapping between the first portion and the second portion of the transformed image and the target device; synthesizing the first portion and the second portion to obtain a final display image. In the present invention, different frequency portions of the image perform gamut (Continued)

mapping independently, and the mapping result is synthesized to obtain a final image.

2 Claims, 1 Drawing Sheet

(51) Int. Cl.
*G06T 7/90* (2017.01)
*G06T 11/00* (2006.01)
*G06T 7/13* (2017.01)
*G06T 7/11* (2017.01)
*G06T 7/168* (2017.01)

(52) U.S. Cl.
CPC .............. *G06T 7/90* (2017.01); *G06T 11/001* (2013.01); *G06T 2207/20024* (2013.01); *G06T 2207/20056* (2013.01); *G06T 2207/20192* (2013.01); *G06T 2207/20224* (2013.01)

(56) References Cited

U.S. PATENT DOCUMENTS

| | | | | |
|---|---|---|---|---|
| 2012/0306904 | A1* | 12/2012 | Francois | G06T 7/194 345/589 |
| 2014/0118585 | A1* | 5/2014 | Naccari | H04N 1/6072 348/270 |

OTHER PUBLICATIONS

Hou, Xiaodi, and Liqing Zhang. "Saliency detection: A spectral residual approach." Computer Vision and Pattern Recognition, 2007. CVPR'07. IEEE Conference on. IEEE, 2007.*

Johnson, Garrett M., and Mark D. Fairchild. "A top down description of S-CIELAB and CIEDE2000." Color Research & Application 28.6 (2003): 425-435.*

* cited by examiner

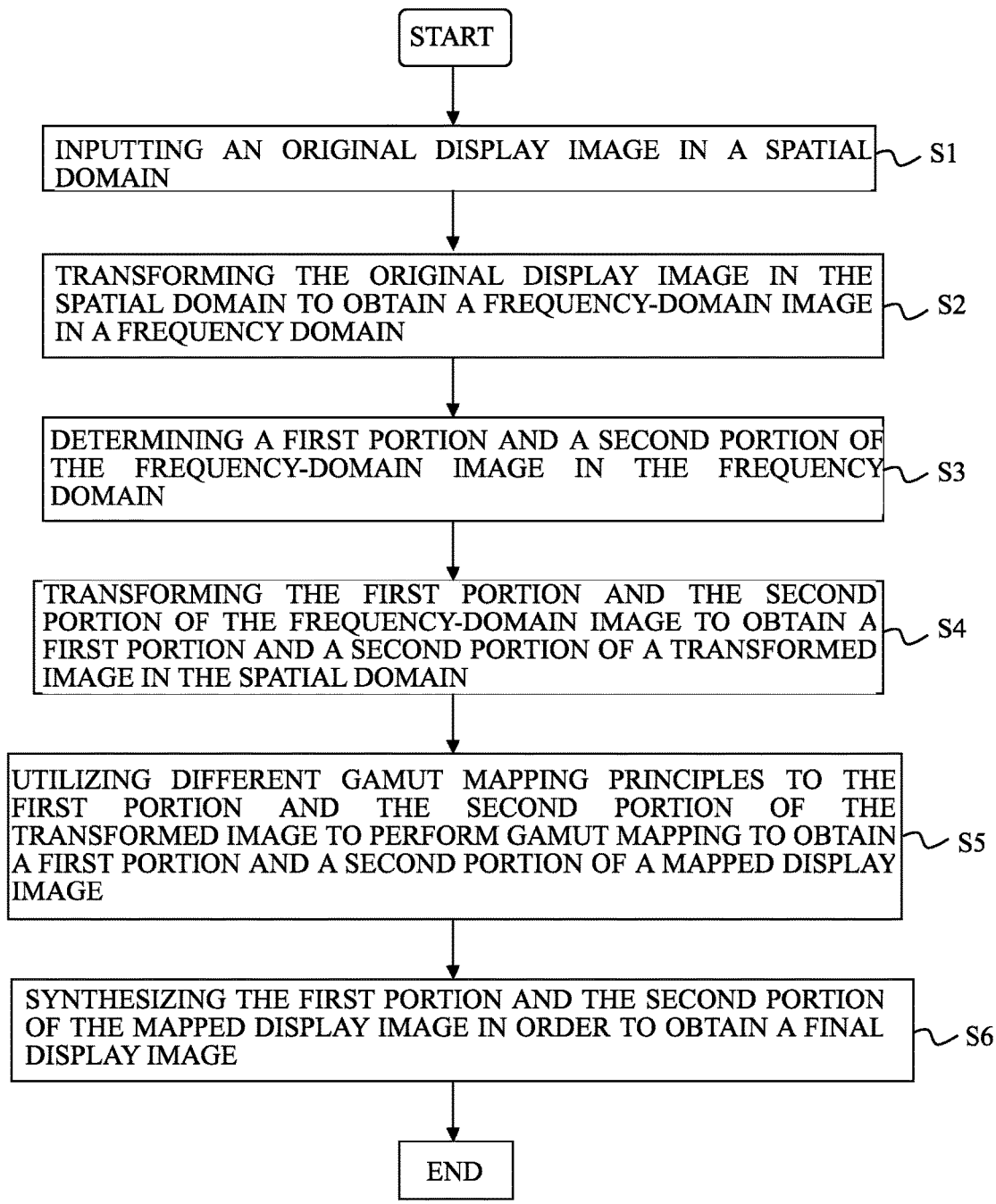

GAMUT MAPPING METHOD

BACKGROUND OF THE INVENTION

1. Field of the Invention

The present invention relates to a display device field, and more particularly to a gamut mapping method for displaying and printing a same image between different display devices.

2. Description of Related Art

A gamut mirroring or a gamut mapping is to precisely express gamuts of two different devices in a color space unrelated to the two devices. Then through a reasonable mapping algorithm, compressing colors in a gamut of a source device to a gamut of a target device such that a distortion of the colors can be as small as possible visually.

The conventional gamut mapping is based on a mapping between a gamut formed by connecting points corresponding to maximum saturation colors of three color components of red/green/blue (R/G/B) in a chromaticity space and a gamut formed by connecting points corresponding to maximum saturation colors of other display base colors (such as three color components of cyan/magenta/yellow (C/M/Y) for a color printer) in a chromaticity space.

When performing a gamut mapping, a source gamut and a target gamut should be considered. The source gamut can be a gamut of a source device or a gamut of a source image (a display image). However, a gamut mapping based on the gamut of the source device has a greater loss than a gamut mapping based on the gamut of the display image in a transfer and reproduce process. Therefore, in the conventional art, a gamut mapping between different devices is usually based on the gamut of the display image in order to obtain a better mapping effect.

For the display image, the gamut mapping method mainly adjusts lightness and chroma, and maintains hue to be constant to performing the gamut mapping. However, in the gamut mapping, the adjustment of the lightness and chroma cannot achieve a best status in the same time.

SUMMARY OF THE INVENTION

The embodiment of the present invention is to provide a gamut mapping method which utilizes different gamut mapping principles to different frequency portions of a display image in order to solve.

According to an aspect of the present invention, the present invention provides: a gamut mapping method comprising step of: (a) inputting an original display image in a spatial domain; (b) transforming the original display image in the spatial domain in order to obtain a frequency-domain image corresponding to the original display image in a frequency domain; (c) determining a first portion and a second portion of the frequency-domain image in the frequency domain, wherein the first portion of the frequency-domain image is a portion of the frequency-domain image which is higher than a preset frequency, and the second portion of the frequency-domain image is a portion of the frequency-domain image which is not higher than the preset frequency; (d) respectively transforming the first portion and the second portion of the frequency-domain image in the frequency domain in order to obtain a first portion and a second portion of a transformed image in the spatial domain; (e) respectively utilizing different gamut mapping principles to the first portion and the second portion of the transformed image in the spatial domain in order to perform a first gamut mapping between the first portion of the transformed image and a target device, and perform a second gamut mapping between the second portion of the transformed image and the target device in order to obtain a first portion and a second portion of a mapped display image in the spatial domain; (f) synthesizing the first portion and the second portion of the mapped display image in order to obtain a final display image in the spatial domain.

Optionally, the step (c) includes: determining a first portion or a second portion of the frequency-domain image; and when the first portion of the frequency-domain image is determined, subtracting the first portion of the frequency-domain image from the frequency-domain image in order to obtain the second portion of the frequency-domain image; when the second portion of the frequency-domain image is determined, subtracting the second portion of the frequency-domain image from the frequency-domain image in order to obtain the first portion of the frequency-domain image.

Optionally, the step of determining a first portion of the frequency-domain image includes: utilizing an edge detection method to perform a high frequency edge sharpening for the frequency-domain image in order to obtain the first portion of the frequency-domain image.

Optionally, the step of determining a first portion of the frequency-domain image includes: high frequency filtering the frequency-domain image in order to filter out the portion of the frequency-domain image which is not higher than the preset frequency in order to determine the first portion of the frequency-domain image.

Optionally, the step of determining a second portion of the frequency-domain image includes: low frequency filtering the frequency-domain image in order to filter out the portion of the frequency-domain image which is higher than the preset frequency in order to determine the second portion of the frequency-domain image.

Optionally, the step (e) includes: for the first portion of the transformed image in the spatial domain, performing the first gamut mapping between the first portion of the transformed image and the target device based on a gamut mapping principle of maintaining chroma to be constant, and adjusting lightness and hue; for the second portion of the transformed image in the spatial domain, performing the second gamut mapping between the second portion of the transformed image and the target device based on a gamut mapping principle of maintaining a contrast ratio of maximum lightnesses to be constant, and adjusting hue and chroma.

Utilizing the gamut mapping method above, the present invention utilizes a mapping from a source image gamut to a target gamut such that in a transfer and reproduce process of the image, the loss is reduced, the gamut mapping effect is better, and the calculation amount for determining the gamut of the source image is reduced.

BRIEF DESCRIPTION OF THE DRAWINGS

FIG. 1 is a flowchart of a gamut mapping method according to an embodiment of the present invention.

DETAILED DESCRIPTION OF THE PREFERRED EMBODIMENT

The following content combines figures and embodiments for detail description of the present invention.

The following content will describe an exemplary embodiment of the present invention in detail. The example of the embodiment is shown in the FIGURE, wherein, the same numeral always indicates the same element.

In summary, an inputted video signal of a display image includes high frequency signals and low frequency signals (that is, a high-frequency component and a low-frequency component). Generally, the high-frequency component means that a location of an image that intensity (brightness/grayscale) of the image is changed greatly. That is, we often say an edge (outline). The low-frequency component means that a location of an image that intensity (brightness/grayscale) of the image is changed smoothly. That is, a location of the image having a large color block.

Actually, perception degrees of a human eye for lightness and chroma are different in different spatial frequency. For example, a human eye is more sensitive to a high-frequency portion of an image. Therefore, in the gamut mapping method of the embodiment of the present invention, a gamut mapping method for different frequency portions of an image utilizing corresponding gamut mapping principles is provided.

FIG. 1 is a flowchart of a gamut mapping method according to an embodiment of the present invention With reference to FIG. 1, in a step S10, inputting an original display image in a spatial domain.

In a step S20, transforming the original display image in the spatial domain in order to obtain a frequency-domain image corresponding to the original display image in a frequency domain. Here, various conventional methods such as the Fourier transform can be used to achieve transforming the original display image in the spatial domain in order to obtain frequency-domain image corresponding to the original display image in a frequency domain. The transformation method is a common knowledge in this technology field, the present invention does not repeat it again.

In a step S30, determining a first portion and a second portion of the frequency-domain image corresponding to the original display image in the frequency domain. Here, the first portion of the frequency-domain image is a portion of the frequency-domain image which is higher than a preset frequency (that is, a high-frequency portion of the display image). The second portion of the frequency-domain image is a portion of the frequency-domain image which is not higher than the preset frequency (that is, a low-frequency portion of the display image)

In the first embodiment of the step S30, the first portion and the second portion of the frequency-domain image in the frequency domain can be determined respectively.

For an example, the step of determining a first portion and a second portion of the frequency-domain image in the frequency domain includes: high frequency filtering the frequency-domain image in order to filter out the portion of the frequency-domain image which is not higher than the preset frequency in order to determine the first portion of the frequency-domain image. That is, filtering out the second portion of the frequency-domain image in the frequency domain, and reserving the first portion of the frequency-domain image. For example, filtering the frequency-domain image in the frequency domain using a high pass filter (such as a Butterworth high-pass filter) in order to obtain the first portion of the frequency-domain image in the frequency domain.

The step of determining the second portion of the frequency-domain image includes: low frequency filtering the frequency-domain image in the frequency domain in order to filter out the portion of the frequency-domain image which is higher than the preset frequency in order to determine the second portion of the frequency-domain image. That is, filtering out the first portion of the frequency-domain image in the frequency domain, and reserving the second portion of the frequency-domain image. For example, filtering the frequency-domain image in the frequency domain using a low pass filter (such as a median filter or a mean filter) in order to obtain the second portion of the frequency-domain image in the frequency domain.

For another example, the step of determining a first portion of the frequency-domain image further includes: utilizing an edge detection method to perform a high frequency edge sharpening for the frequency-domain image in order to obtain the first portion of the frequency-domain image. For example, the present invention uses a Laplace operation to perform the high frequency edge sharpening to describe a sudden change region of a change of lightness of the frequency-domain image in order to obtain the first portion of the frequency-domain image in the frequency domain. Here, the edge detection method is a common knowledge in this technology field, the present invention does not repeat it again.

In a second embodiment of the step S30, the present invention can determine the first portion of the frequency-domain image firstly, then, subtracting the first portion of the frequency-domain image from the frequency-domain image in order to obtain the second portion of the frequency-domain image. Or, the present invention can determine the second portion of the frequency-domain image firstly, then, subtracting the second portion of the frequency-domain image from the frequency-domain image in order to obtain the first portion of the frequency-domain image.

In this situation, it can be understood that in the step S30, the present invention can determine the first portion of the frequency-domain image firstly or determine the second portion of the frequency-domain image firstly. Person skilled in the art can choose according to an actual requirement. Here, subtracting the first portion of the frequency-domain image from the frequency-domain image or subtracting the second portion of the frequency-domain image from the frequency-domain image is common knowledge in this technology field, the present invention does not repeat it again.

In the step S40, respectively transforming the first portion and the second portion of the frequency-domain image in the frequency domain in order to obtain a first portion and a second portion of a transformed image in the spatial domain. Here, various conventional methods (such as an inverse Fourier transform) can be used to achieve transforming the first portion and the second portion of the frequency-domain image in the frequency domain to the spatial domain. The above transforming method is common knowledge in this technology field, the present invention does not repeat it again.

In the step S50, respectively utilizing different gamut mapping principles to the first portion and the second portion of the transformed image in the spatial domain in order to perform a first gamut mapping between the first portion of the transformed image and a target device, and perform a second gamut mapping between the second portion of the transformed image and the target device in order to obtain a first portion and a second portion of a mapped display image in the spatial domain.

Here, because a human eye has different sensitive degrees for lightness and chroma of the first portion and the second portion of the transformed image. Therefore, different gamut mapping principles are applied to the first portion and the second portion of the transformed image in the spatial domain.

Optionally, for the first portion of the transformed image in the spatial domain, the present invention performs the first gamut mapping between the first portion of the transformed image and the target device based on a gamut mapping principle of maintaining chroma to be constant and adjusting lightness and hue. Here, various conventional gamut mapping methods can be used to perform the gamut mapping between the first portion of the transformed image and the target device based on a gamut mapping principle of maintaining chroma to be constant and adjusting lightness and hue.

Optionally, for the second portion of the transformed image in the spatial domain, performing the second gamut mapping between the second portion of the transformed image and the target device based on a gamut mapping principle of maintaining a contrast ratio of maximum lightnesses to be constant, and adjusting hue and chroma. Here, various conventional gamut mapping methods can be used to perform gamut mapping between the second portion of the transformed image and the target device based on the gamut mapping principle of maintaining a contrast ratio of maximum lightnesses to be constant, and adjusting hue and chroma.

In can be understood that the principle of maintaining chroma to be constant and adjusting lightness and hue and the principle of maintaining a contrast ratio of maximum lightnesses to be constant, and adjusting hue and chroma are common knowledge in this technology field, the present invention does not repeat it again.

In the step S60, synthesizing the first portion and the second portion of the mapped display image in order to obtain a final display image in the spatial domain.

Here, various methods can be used for synthesizing the first portion and the second portion of the mapped display image in order to obtain a final display image in the spatial domain.

As an example, under a situation of the first embodiment of the step S30, in the step S60, the first portion of the mapped display image and the second portion of the mapped display image can be superimposed, that is, adding the first portion of the mapped display image and the second portion of the mapped display image together and dividing the adding result by two in order to obtain the final display image in the spatial domain Under a situation of the second embodiment of the step S30, in the step S60, the first portion of the mapped display image and the second portion of the mapped display image can be added up directly in order to obtain the final display image in the spatial domain Utilizing gamut mapping method of the embodiment of the present invention, different frequency portions of the image perform gamut mapping independently, and the mapping result is synthesized to obtain a final image in order to achieve a better gamut mapping effect.

Utilizing gamut mapping method of the embodiment of the present invention, different frequency portions of the image perform gamut mapping independently, which can reserve chroma and fidelity for some images better.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:
1. A gamut mapping method comprising step of:
(a) inputting an original display image in a spatial domain;
(b) transforming the original display image in the spatial domain through a Fourier transform in order to obtain a frequency-domain image corresponding to the original display image in a frequency domain;
(c) determining a first portion and a second portion of the frequency-domain image in the frequency domain, wherein the first portion of the frequency-domain image is a portion of the frequency-domain image which is higher than a preset frequency, and the second portion of the frequency-domain image is a portion of the frequency-domain image which is not higher than the preset frequency;
(d) respectively transforming the first portion and the second portion of the frequency-domain image in the frequency domain through an inverse Fourier transform in order to obtain a first portion and a second portion of a transformed image in the spatial domain;
(e) respectively utilizing different gamut mapping principles to the first portion and the second portion of the transformed image in the spatial domain in order to perform a first gamut mapping between the first portion of the transformed image and a target device, and perform a second gamut mapping between the second portion of the transformed image and the target device in order to obtain a first portion and a second portion of a mapped display image in the spatial domain;
(f) synthesizing the first portion and the second portion of the mapped display image in order to obtain a final display image in the spatial domain;
wherein, the step of determining a first portion of the frequency-domain image includes: high frequency filtering the frequency-domain image in order to filter out the portion of the frequency-domain image which is not higher than the preset frequency in order to determine the first portion of the frequency-domain image;
wherein, the step of determining a second portion of the frequency-domain image includes: low frequency filtering the frequency-domain image in order to filter out the portion of the frequency-domain image which is higher than the preset frequency in order to determine the second portion of the frequency-domain image; and
wherein, the step (f) comprises: the first portion of the mapped display image and the second portion of the mapped display image are superimposed, that is, adding the first portion of the mapped display image and the second portion of the mapped display image together and dividing the adding result by two in order to obtain the final display image in the spatial domain.

2. The method according to claim 1, wherein, the step (e) includes: for the first portion of the transformed image in the spatial domain, performing the first gamut mapping between the first portion of the transformed image and the target device based on a gamut mapping principle of maintaining chroma to be constant, and adjusting lightness and hue; for the second portion of the transformed image in the spatial domain, performing the second gamut mapping between the second portion of the transformed image and the target device based on a gamut mapping principle of maintaining a contrast ratio of maximum lightnesses to be constant, and adjusting hue and chroma.

* * * * *